United States Patent [19]

Tanaka

[11] Patent Number: 5,418,772
[45] Date of Patent: May 23, 1995

[54] ELECTROMAGNETIC OBJECTIVE LENS DRIVING APPARATUS OF OPTICAL DATA RECORDING AND REPRODUCING APPARATUS INCLUDING A ONE-PIECE YOKE MEMBER

[75] Inventor: Akihiro Tanaka, Tokyo, Japan

[73] Assignee: Asahi Kogaku Kogyo Kabushiki Kaisha, Tokyo, Japan

[21] Appl. No.: 98,056

[22] Filed: Jul. 28, 1993

[30] Foreign Application Priority Data

Jul. 28, 1992 [JP] Japan .................. 4-201045

[51] Int. Cl.⁶ .......................... G11B 21/02; G11B 7/08
[52] U.S. Cl. ........................... 369/219; 369/44.14
[58] Field of Search ............... 369/44.14, 44.15, 44.16, 369/44.22, 215, 219; 359/813, 814, 823, 824

[56] References Cited

U.S. PATENT DOCUMENTS

| | | | |
|---|---|---|---|
| 4,641,296 | 2/1987 | Mizunoe et al. | 369/44.16 |
| 4,669,823 | 6/1987 | Iguma et al. | 359/814 |
| 4,796,248 | 1/1989 | Ozaki et al. | 359/823 |
| 5,103,438 | 4/1992 | Masunaga et al. | 359/823 |
| 5,134,527 | 7/1992 | Cou | 359/823 |
| 5,187,702 | 2/1993 | Takahashi | 369/219 |
| 5,200,940 | 4/1993 | Goto et al. | 369/44.15 |

Primary Examiner—A. J. Heinz
Assistant Examiner—Brian E. Miller
Attorney, Agent, or Firm—Sandler, Greenblum & Bernstein

[57] ABSTRACT

An electromagnetic driving apparatus of an objective lens in an optical data recording and reproducing apparatus including a movable carriage, and an objective lens holder which supports the objective lens to converge laser beams onto the optical disc and which is supported on the carriage to move in focusing and tracking directions. Focusing and tracking coils are provided on the objective lens holder, together with a magnetic circuit including permanent magnets and a yoke member. The yoke member is made of a single piece including a magnetic shield wall having a laser transmission hole opposed to the optical disc, a plurality of yoke walls extending substantially perpendicularly to the magnetic shield wall towards the carriage, and a plurality of mounting flanges extending from the yoke walls to lie on the carriage, so that the mounting flanges can be secured to the carriage.

11 Claims, 4 Drawing Sheets

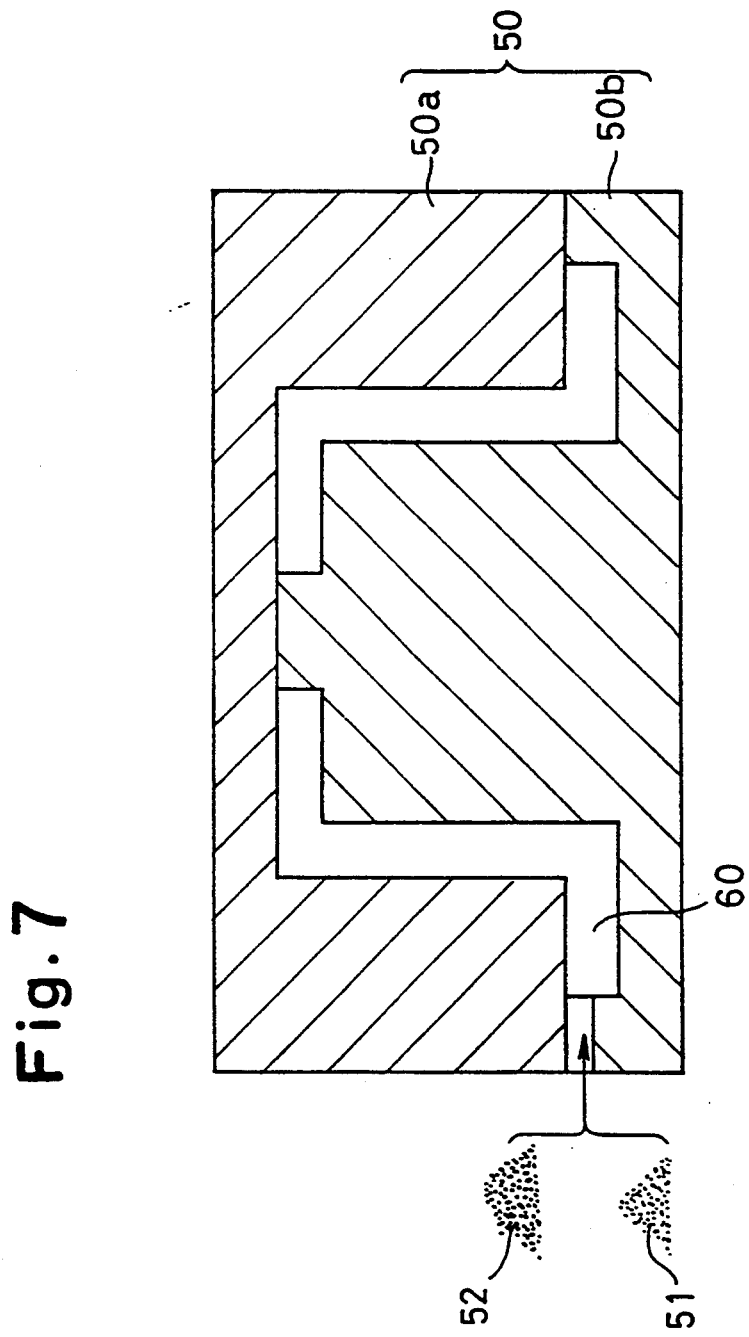

ELECTROMAGNETIC OBJECTIVE LENS DRIVING APPARATUS OF OPTICAL DATA RECORDING AND REPRODUCING APPARATUS INCLUDING A ONE-PIECE YOKE MEMBER

BACKGROUND OF THE INVENTION

1. Field of the Invention

The present invention relates to an optical data recording and reproducing apparatus that optically reads data from or writes data onto an optical disc. More precisely, the invention relates to a driving apparatus that electromagnetically drives an objective lens thereof.

2. Description of Related Art

In a known optical disc apparatus, such as an opto-magnetic disc apparatus, an objective lens is supported by a carriage that is movable in a radial direction (i.e., tracking direction) of the optical disc. The objective lens is elastically movable in the tracking direction and the focusing direction. A tracking coil and a focusing coil are used to drive the objective lens in the tracking and focusing directions. The tracking coil and focusing coil are provided on a lens holder which holds the objective lens. A magnetic circuit, which constitutes an electromagnetic driving circuit together with the tracking and focusing coils, is provided on the carriage. The focusing and tracking coils are supplied with predetermined directions and intensities of electric current to drive the objective lens holder in a manner such that the laser beams converged by the objective lens correctly trace the recording track of the optical disc.

In the known electromagnetic objective lens driving apparatus, the magnetic circuit on the carriage includes a permanent magnet and a cantilever type yoke member which is secured at one end thereof to the carriage. The yoke member can be opened at the free end side thereof adjacent to the optical disc upon assembly. Thus, assembly can be simplified. Upon assembling, the permanent magnet, and the lens holder, etc., are accommodated in the yoke member, and thereafter, the latter is covered by a magnetic shield plate.

The carriage on which the lens holder and the magnetic circuit are provided should be as light and small as possible in view of the desire for fast access times. The same is true for the magnetic circuit. Namely, the permanent magnet and the yoke member of the magnetic circuit must be as light and small as possible. This however reduces the mechanical strength, thus resulting in occurrence of resonance which has an adverse influence on the precision of the tracking and focusing operations.

Furthermore, in the conventional electromagnetic driving apparatus, there is a large number of components, including the yoke member and the magnetic shield plate separate from the yoke member. This complicates the assembling operation.

The primary object of the present invention is to eliminate the drawbacks of the prior art as mentioned above, by providing a simple, small and light electromagnetic driving apparatus of an objective lens, which has a sufficient mechanical strength and fewer components, and in which no resonance tends to occur.

SUMMARY OF THE INVENTION

To achieve the object mentioned above, according to the present invention, there is provided an electromagnetic driving apparatus of an objective lens in an optical data recording and reproducing apparatus having an optical disc, and including a carriage which is movable in a radial direction of the optical disc. An objective lens holder which supports the objective lens to converge laser beams onto the optical disc is supported on the carriage so as to move in focusing and tracking directions of the optical disc. Focusing and tracking coils are provided on the objective lens holder, and a magnetic circuit includes permanent magnets and a yoke member, and is provided on the carriage to constitute electromagnetic circuits in the tracking and focusing directions together with the tracking and focusing coils. The yoke member is made of a single piece including a magnetic shield wall having a laser transmission hole opposed to the optical disc. A plurality of yoke walls extend substantially perpendicularly to the magnetic shield wall towards the carriage. A plurality of mounting flanges extend from the yoke walls to lie on the carriage, so that the mounting flanges can be secured to the carriage.

With this structure, the yoke member is considerably stronger than the conventional cantilever type yoke member, and accordingly, the yoke member can be made lighter and thinner than the cantilever type yoke member without inviting or giving rise to resonance.

The yoke member can be formed either by cutting a block of material or by a metal injection molding, which is less expensive.

Preferably, provision is made for an elastic mechanism for moving the objective lens holder relative to the carriage with an elastic force.

According to another aspect of the present invention, there is provided an electromagnetic driving apparatus of an objective lens to be opposed to an optical disc. The electromagnetic driving apparatus includes a carriage which is movable in a radial direction of the optical disc and an objective lens which is supported on the carriage to converge laser beams onto the optical disc. A yoke member of magnetic material is secured to the carriage, and is made of a single molded piece including a plurality of mounting flanges secured to the carriage in a symmetric arrangement with respect to the optical axis of the objective lens and extending perpendicularly to the optical axis. A plurality of yoke walls extend from inner ends of the mounting flanges adjacent to the objective lens substantially in parallel with the optical axis of the objective lens. A magnetic shield wall, opposed to the optical disc and lying in a plane perpendicular to the optical axis, is provided to connect the upper ends of the yoke walls adjacent to the optical disc, and the magnetic shield wall is provided with a central laser transmission hole through which the laser beams pass.

The yoke member can be of symmetrical shape in a sectional view with respect to the optical axis. Preferably, the one-half of the yoke member in a sectional view with respect to the optical axis is generally crank-shaped.

Focusing and tracking coils can be provided on the objective lens holder.

Additionally, permanent magnets can be provided on the yoke member to constitute electromagnetic driving circuits in the tracking and focusing directions together with the tracking and focusing coils.

According to still another aspect of the present invention, an electromagnetic driving apparatus of an objective lens to be opposed to an optical disc includes a carriage which is movable in a radial direction of the optical disc, and an objective lens holder which holds the objective lens to converge laser beams onto the optical disc, and which is supported on the carriage to move in tracking and focusing directions of the optical disc. Tracking and focusing coils are provided on the objective lens holder, and a magnetic circuit, which constitutes electromagnetic driving circuits in the tracking and focusing directions together with the tracking and focusing coils and which is comprised of permanent magnets and a yoke member, is provided on the carriage. The yoke member is symmetrical in shape in the tracking direction and is provided on a center portion thereof with a pair of tracking permanent magnets and a pair of focusing permanent magnets provided on opposite sides of the tracking permanent magnets.

Preferably, the yoke member is made of a single metal injection molded piece including a plurality of mounting flanges secured to the carriage in a symmetric arrangement with respect to the optical axis of the objective lens and extending perpendicularly to the optical axis. Further a plurality of yoke walls extend from inner ends of the mounting flanges adjacent to the objective lens substantially in parallel with the optical axis of the objective lens, and a magnetic shield wall is opposed to the optical disc and extends in a plane perpendicular to the optical axis to connect the upper ends of the yoke walls adjacent to the optical disc. The magnetic shield wall is provided with a central laser transmission hole through which the laser beams pass.

BRIEF DESCRIPTION OF THE DRAWINGS

The invention will be described below in detail with reference to the accompanying drawings, in which;

FIG. 7 is a conceptual view of a metal injection molding die for molding a yoke member of an electromagnetic driving apparatus of an objective lens, according to the present invention.

DESCRIPTION OF THE PREFERRED EMBODIMENT

Figure 2:
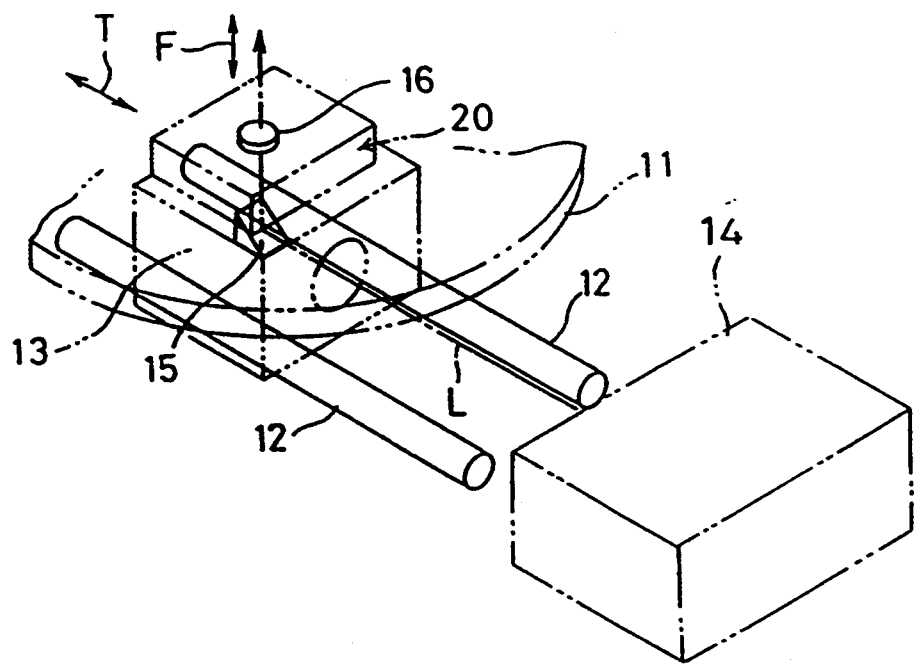
FIG. 2 is a perspective view of main components of an optical data recording and reproducing apparatus to which the present invention is applied.

As shown in FIG. 2, a pair of guide rails 12 is provided below an optical disc 11 which can be rotated, the guide rails extending in the radial direction of the optical disc 11. A carriage 13 is supported by and on the guide rails 12 to move along the same. The carriage 13 is provided thereon with a prism 15 which reflects the laser beams L incident along the rails 12 from an immovable optical system 14 into the vertical and upward direction. An objective lens 16 which converges the laser beams reflected by the prism 15 onto the recording surface of the optical disc 11, and an electromagnetic driving mechanism 20, which drives the objective lens 16 in the focusing and tracking directions F and T are also provided.

Figure 1:
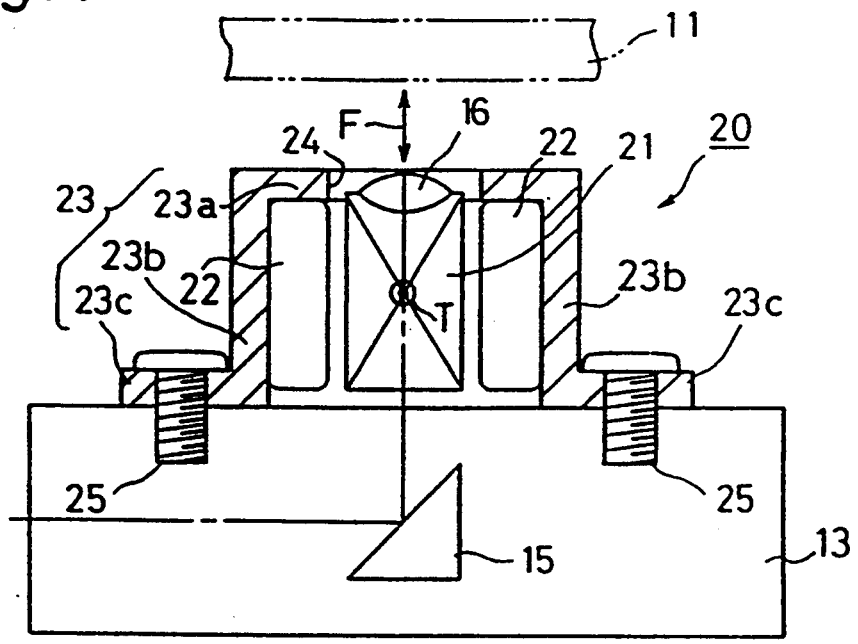
FIG. 1 is a sectional view of an electromagnetic driving apparatus of an objective lens in an optical data recording and reproducing apparatus according to the present invention.

FIG. 1 shows a basic concept of an electromagnetic driving apparatus 20 of the present invention, in which the objective lens 16 is supported by an objective lens holder 21 which is in turn supported on the carriage 13 so as to move in the focusing and tracking directions F and T through an elastically deformable support, such as a suspension wire (not shown). The objective lens holder 21 is provided with focusing and tracking coils secured thereto.

The carriage 13 is provided with a magnetic circuit which constitutes an electromagnetic driving mechanism together with the focusing and tracking coils. The magnetic circuit includes a permanent magnet 22 and a yoke member 23 which is made of a magnetic material. The improvement of the present invention is mainly addressed to the yoke member 23. Namely, the yoke member 23 is provided with a magnetic shield wall 23a which lies in a plane parallel with the optical disc 11, a plurality of yoke walls 23b facing in different directions, and a plurality of mounting flanges 23c which extend from the yoke walls 23b to lie on the carriage 13. The yoke walls 23b extend perpendicularly to the magnetic shield wall 23a from the peripheral edge of the latter towards the carriage 13. The magnetic shield wall 23a, the yoke walls 23b, and the mounting flanges 23c are integral with each other and are made of a single piece. The magnetic shield wall 23a is provided with a laser transmission hole 24 in which the objective lens 16 is movable, so that the laser beams L pass through the laser transmission hole 24. The mounting flanges 23c are secured to the carriage 13 by mounting screws 25.

The yoke walls 23b are connected to each other at the front ends thereof by the magnetic shield wall 23a, and accordingly, when the yoke member 23 is secured to the carriage 13, a sufficient mechanical strength of the yoke member can be obtained. Consequently, the yoke member 23 can be made thin with no fear of resonance occurring.

Figure 3:
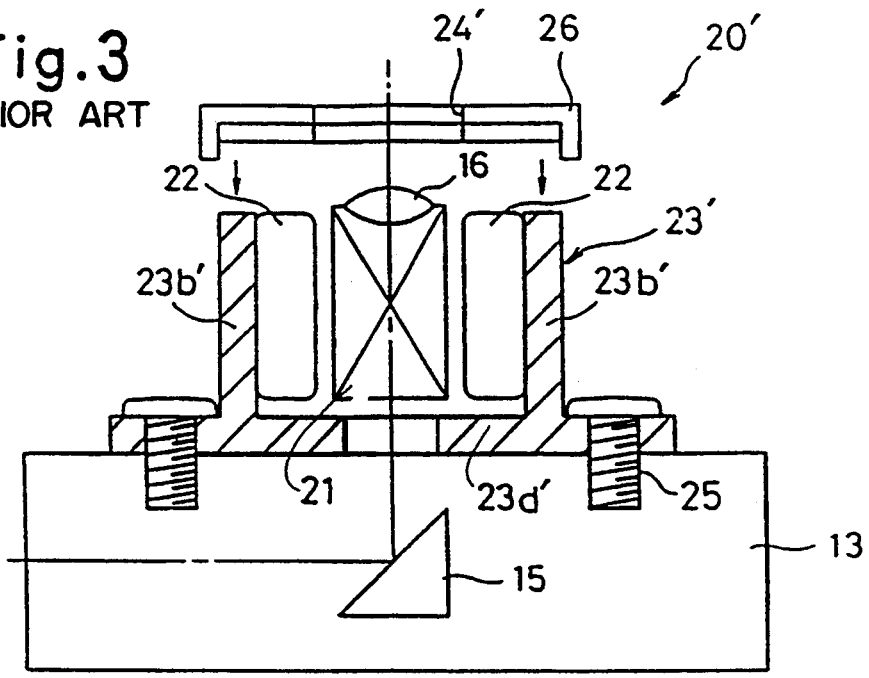
FIG. 3 is a sectional view of a known electromagnetic driving apparatus of an objective lens corresponding to FIG. 1.

FIG. 3 shows a known electromagnetic driving mechanism 20' having a yoke member 23' to be compared with the electromagnetic driving mechanism 20. A plurality of yoke walls 23b' are interconnected by a bottom plate 23d' on the side adjacent to the carriage 13, and are opened at the free end side thereof adjacent to the optical disc 11. Namely, the yoke walls 23' are cantilever type arms that are interconnected only at the bottom ends thereof adjacent to the carriage 13. The separate free ends of the yoke walls 23' are covered by a magnetic shield cover 26, which is provided with a laser transmission hole 24'. The yoke member 23' is secured to the carriage 13 through the bottom plate 23d' by mounting screws 25 .

In the known arrangement shown in FIG. 3, the cantilever type yoke walls 23b' tend to resonate. Moreover, the magnetic shield cover 26, as a separate piece, must be provided, thus resulting in an increased number of the components of the yoke member and a complicated assembly. In addition, the bottom plate (wall) 23d', when secured to the carriage 13, does not substantially contribute to the reinforcement of the yoke member 23' and increases the whole weight of the yoke member. The dead load (bottom plate 23d') should be removed to realize a small and light electromagnetic driving mechanism. These problems can be solved in the present invention.

Figure 4:
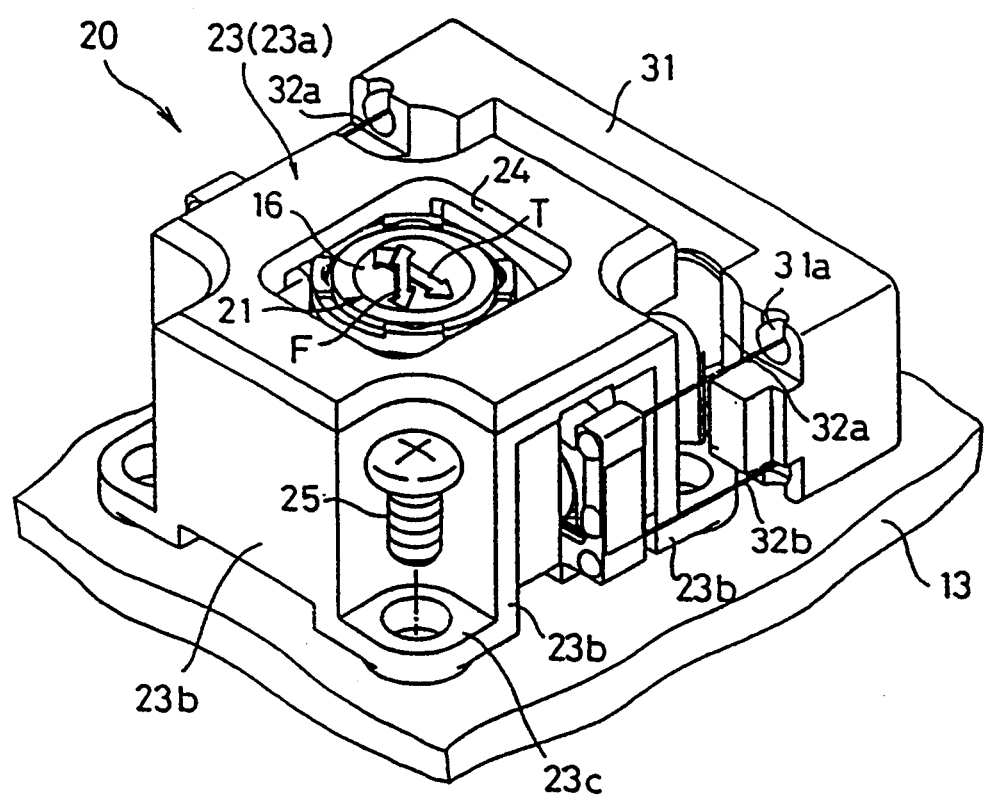
FIG. 4 is a sectional view of an electromagnetic driving apparatus of an objective lens in an optical data recording and reproducing apparatus according to another embodiment of the present invention.
Figure 5:
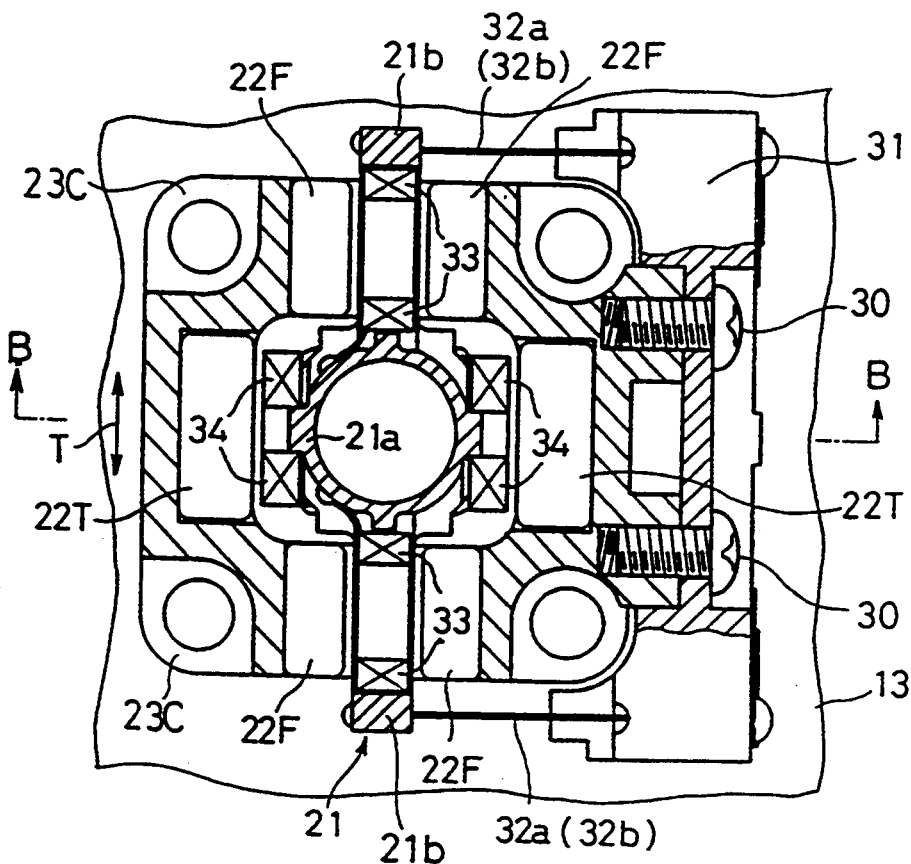
FIG. 5 is a sectional view taken along the line A—A in FIG. 6.
Figure 6:
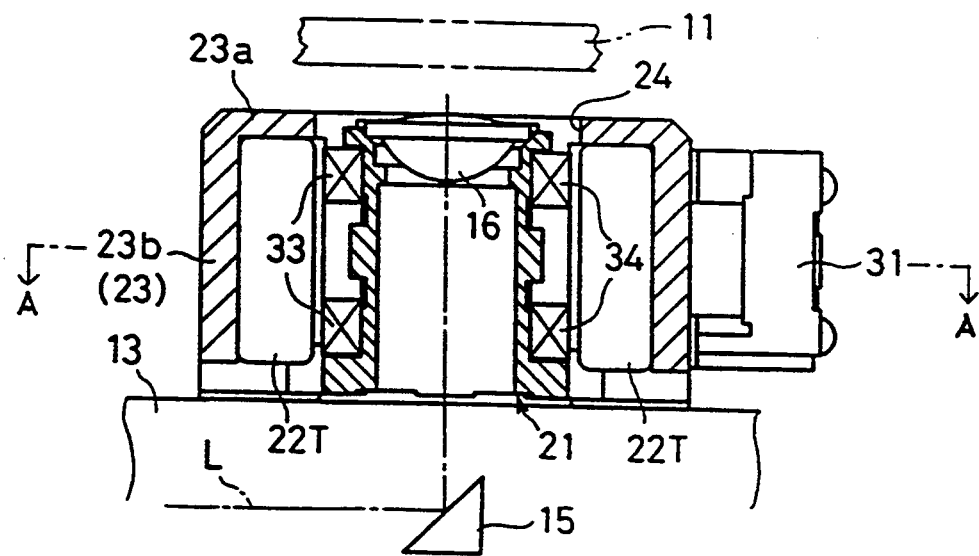
FIG. 6 is a sectional view taken along the line B—B in FIG. 5.

FIGS. 4 through 6 show another embodiment of an electromagnetic driving apparatus according to the present invention.

The yoke member 23 which is secured to the carriage 13 by the mounting screws 25 is provided with a supporting block 31 of the objective lens holder 21 secured thereto by mounting screws 30 (FIG. 5). Four suspension wires 32a, 32b which are spaced from one another in the focusing direction F and the tracking direction T are connected at one end thereof to the supporting block 31. The other ends of the suspension wires 32a and 32b are connected to the objective lens holder 21. The objective lens holder 21 and accordingly the objective lens 16 are displaced in the focusing direction F and the tracking direction T by the elastic force of the suspension wires 32a and 32b.

The objective lens holder 21 is provided with a pair of focusing coils 33 secured thereto, which are spaced from one another in the tracking direction T and located in a symmetric arrangement with respect to the objective lens 16. Similarly, the objective lens holder 21 is provided with a pair of tracking coils 34 secured thereto, which are spaced from one another in a direction perpendicular to the tracking direction T and located in a symmetric arrangement with respect to the objective lens 16.

The yoke member 23 is provided with focusing permanent magnets 22F and tracking permanent magnets 22T secured thereto, that constitute an electromagnetic driving circuit together with the focusing coils 33 and the tracking coils 34. The focusing permanent magnets 22F and the tracking permanent magnets 22T are secured to the inner surfaces of the corresponding yoke walls 23b of the yoke member 23.

In the electromagnetic driving mechanism 20 as constructed above, when predetermined directions and intensities of electric current are supplied to the focusing coils 33 and the tracking coils 34, the objective lens holder 21 and accordingly the objective lens 16 are electromagnetically driven in the focusing direction F and the tracking direction T.

The illustrated embodiments are given by way of example and the present invention is not limited thereto. For instance, the shape of the objective lens holder 21 is optional. Namely, the shape of the objective lens holder 21 depends on the shape of the yoke member 23 which depends in turn on the shapes and positions of the focusing coils 33 and the tracking coils to be supported thereon.

The yoke member 23 is preferably formed by a metal injection molding per se known. In the metal injection molding process, metal powders are injected together with a binder into an injection molding die and are heated and pressurized therein. The modern injection molding technology makes it possible to form precise and correct yoke members.

FIG. 7 schematically shows the principle of the metal injection molding. A mixture of metal powders 51 and a binder 52 is injected into a molding cavity 60 defined by upper and lower molding dies 50a and 50b of a die assembly 50. The shape of the molding cavity 60 corresponds to the shape of the yoke member 23. The mixture 51 is then heated and pressurized in the molding cavity 60 to obtain a molded product (yoke member).

As can be understood from the above discussion, according to the present invention, since the yoke member provided on the carriage to constitute a magnetic circuit together with the permanent magnets, is made of a single piece including of a magnetic shield wall having a laser transmission hole opposed to the optical disc, a plurality of yoke walls extending substantially perpendicularly to the magnetic shield wall towards the carriage, and a plurality of mounting flanges extending from the yoke walls along the carriage to be secured thereto, the mechanical strength is remarkably enhanced in comparison with a conventional cantilever type of yoke member. Accordingly, the yoke member can be made thinner and smaller than the cantilever type of yoke member. Moreover, according to the present invention, since no resonance of the yoke member occurs, the focusing and tracking can be precisely and correctly carried out.

I claim:

1. An electromagnetic driving apparatus of an objective lens in an optical data recording and reproducing apparatus having an optical disc, comprising;
   a carriage which is movable in a radial direction of the optical disc;
   an objective lens holder which supports the objective lens to converge laser beams onto the optical disc and which is supported on the carriage so as to move in focusing and tracking directions of the optical disc;
   focusing and tracking coils provided on the objective lens holder; and,
   a magnetic circuit comprising permanent magnets and a yoke member, and provided on the carriage to constitute electromagnetic circuits in the tracking and focusing directions together with the tracking and focusing coils;
   said yoke member including a magnetic shield wall having a laser transmission hole and extending in a plane substantially parallel to the optical disc, a plurality of yoke walls extending from and substantially perpendicularly with respect to the magnetic shield wall towards the carriage, and a plurality of mounting flanges extending from the yoke walls substantially parallel to said magnetic shield wall to lie on the carriage, so that the mounting flanges can be secured to the carriage, said magnetic shield wall, yoke walls and mounting flanges forming a single integral unit, wherein a region extending in a plane of and inwardly of said mounting flanges beyond said yoke walls is open to allow access to components of said magnetic circuit within said yoke member.

2. An electromagnetic driving apparatus of an objective lens according to claim 1, wherein said yoke member is made by metal injection molding.

3. An electromagnetic driving apparatus of an objective lens according to claim 2, further comprising elastic means for moving the objective lens holder relative to the carriage with an elastic force.

4. An electromagnetic driving apparatus of an objective lens to be opposed to an optical disc, comprising:
   a carriage which is movable in a radial direction of the optical disc;
   an objective lens which is supported on the carriage to converge laser beams onto the optical disc; and,
   a yoke member of magnetic material secured to the carriage;
   said yoke member including a plurality of mounting flanges secured to the carriage in a symmetric arrangement with respect to an optical axis of the objective lens and extending perpendicularly to the optical axis, a plurality of yoke walls extending from inner ends of the mounting flanges adjacent to the objective lens substantially in parallel with the optical axis of the objective lens, and a magnetic shield wall opposed to the optical disc and lying in a plane perpendicular to the optical axis to connect upper ends of the yoke walls adjacent to the optical axis, said magnetic shield wall being provided with a center laser transmission hole through which the laser beams pass, said magnetic shield wall, yoke walls and mounting flanges forming a single integral unit, wherein a region extending in a plane of and inwardly of said mounting flanges beyond said yoke walls is open to allow access to components of said magnetic circuit within said yoke member.

5. An electromagnetic driving apparatus of an objective lens according to claim 4, wherein said yoke member is of a symmetrical shape in a sectional view with respect to the optical axis.

6. An electromagnetic driving apparatus of an objective lens according to claim 5, wherein one-half of the yoke member in a sectional view with respect to the optical axis is generally crank-shaped, defined by the mounting flange extending substantially perpendicularly to and from one side of said yoke walls, said magnetic shield wall extending substantially perpendicularly to said yoke walls at an end of said yoke walls opposite from said mounting flanges and in a direction Opposite to that of the mounting flanges.

7. An electromagnetic driving apparatus of an objective lens according to claim 6, further comprising an objective lens holder which supports the objective lens and which is supported on the carriage to move in tracking and focusing directions of the optical disc.

8. An electromagnetic driving apparatus of an objective lens according to claim 7, further comprising focusing and tracking coils provided on the objective lens holder.

9. An electromagnetic driving apparatus of an objective lens according to claim 8, further comprising permanent magnets provided on the yoke member to constitute electromagnetic driving circuits in the tracking and focusing directions together with the tracking and focusing coils.

10. An electromagnetic driving apparatus of an objective lens to be opposed to an optical disc, comprising;

a carriage which is movable in a radial direction of the optical disc;

an objective lens holder which holds the objective lens to converge laser beams onto the optical disc and which is supported on the carriage to move in tracking and focusing directions of the optical disc;

tracking and focusing coils provided on the objective lens holder; and, a magnetic circuit which constitutes electromagnetic driving circuits in the tracking and focusing directions together with the tracking and focusing coils and which is comprised of permanent magnets and a yoke member, provided on the carriage;

said yoke member being symmetrical in shape in the tracking direction and being provided on a center portion thereof, with a pair of tracking permanent magnets and a pair of focusing permanent magnets provided on opposite sides of the tracking permanent magnets, said yoke member further comprising a plurality of flange portions extending in a first plane, a plurality of yoke walls extending from each of said flange portions in a direction substantially transverse to the flange portions and parallel to an optical axis of said objective lens, and a magnetic shield wall extending from each of said yoke walls in a direction substantially perpendicular to said yoke walls, said flange portions, said plurality of yoke walls, and said magnetic shield wall forming a single integral unit, wherein a region extending in a plane of and inwardly of said mounting flanges beyond said yoke walls is open to allow access to components of said magnetic circuit within said yoke member.

11. An electromagnetic driving apparatus of an objective lens according to claim 10, wherein the yoke member is made of a single metal injection mold piece including a plurality of mounting flanges secured to the carriage in a symmetric arrangement with respect to the optical axis of the objective lens and extending Perpendicularly to the optical axis, a plurality of yoke walls extending from inner ends of the mounting flanges adjacent to the objective lens substantially in parallel with the optical axis of the objective lens, and a magnetic shield wall opposed to the optical disc and lying in a plane perpendicular to the optical axis to connect upper ends of the yoke walls adjacent to the optical disc, said magnetic shield wall being provided with a center laser transmission hole through which the laser beams pass.

* * * * *

UNITED STATES PATENT AND TRADEMARK OFFICE
CERTIFICATE OF CORRECTION

PATENT NO. : 5,418,772
DATED : May 23, 1995
INVENTOR(S) : A. TANAKA

It is certified that error appears in the above-indentified patent and that said Letters Patent is hereby corrected as shown below:

At column 6, line 20 (claim 1, line 3), change "comprising;" to ---comprising:---.

At column 7, line 9 (claim 4, line 22, change "axis" to ---disc,---.

At column 7, line 30 (claim 6, line 10), change "Opposite" to ---opposite---.

At column 7, line 47 (claim 10, line 20), change "comprising;" to ---comprising:---.

At column 8, line 15 (claim 10, line 17), change "provided" to ---provided,---.

At column 8, lines 39 and 40 (claim 11, lines 6 and 7), change "Perpendicularly" to ---perpendicularly---.

Signed and Sealed this

Eighth Day of April, 1997

Attest:

BRUCE LEHMAN

Attesting Officer

Commissioner of Patents and Trademarks